(12) United States Patent
Barbieri et al.

(10) Patent No.: US 8,908,504 B2
(45) Date of Patent: Dec. 9, 2014

(54) PRE-AGREED RADIO LINK FAILURE RECOVERY CHANNEL SEQUENCE

(75) Inventors: Alan Barbieri, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 142 days.

(21) Appl. No.: 13/535,035

(22) Filed: Jun. 27, 2012

(65) Prior Publication Data

US 2013/0003533 A1    Jan. 3, 2013

Related U.S. Application Data

(60) Provisional application No. 61/504,109, filed on Jul. 1, 2011.

(51) Int. Cl.
*H04W 24/00* (2009.01)
*H04W 36/06* (2009.01)
*H04W 76/02* (2009.01)

(52) U.S. Cl.
CPC ............ *H04W 36/06* (2013.01); *H04W 76/028* (2013.01)
USPC .......................................... 370/225; 370/350

(58) Field of Classification Search
USPC .................................. 370/216, 225, 329, 350
See application file for complete search history.

(56) References Cited

U.S. PATENT DOCUMENTS

| 7,756,532 | B2 | 7/2010 | Wallentin et al. | |
|---|---|---|---|---|
| 7,801,527 | B2 | 9/2010 | Putcha | |
| 8,019,334 | B2 | 9/2011 | Koskela et al. | |
| 2002/0045443 | A1 | 4/2002 | Hunzinger | |
| 2006/0176839 | A1* | 8/2006 | Frazer et al. .................. | 370/312 |
| 2009/0046573 | A1 | 2/2009 | Damnjanovic | |
| 2010/0113023 | A1 | 5/2010 | Huang et al. | |
| 2010/0246419 | A1* | 9/2010 | Batta et al. ..................... | 370/252 |
| 2011/0021154 | A1 | 1/2011 | Marinier et al. | |
| 2011/0080825 | A1* | 4/2011 | Dimou et al. ................. | 370/216 |
| 2011/0103323 | A1* | 5/2011 | Wang et al. ................... | 370/329 |
| 2011/0194630 | A1* | 8/2011 | Yang et al. .................... | 375/260 |
| 2011/0242965 | A1 | 10/2011 | Strzyz et al. | |
| 2011/0250925 | A1* | 10/2011 | Han .............................. | 455/524 |
| 2012/0044813 | A1* | 2/2012 | Nandagopal et al. ......... | 370/242 |

OTHER PUBLICATIONS

International Search Report and Written Opinion—PCT/US2012/044656—ISA/EPO—Oct. 19, 2012.

* cited by examiner

*Primary Examiner* — Brian D Nguyen
(74) *Attorney, Agent, or Firm* — Seyfarth Shaw LLP

(57) ABSTRACT

A method of wireless communication is provided. The method includes transmitting a message to notify a base station of a radio link failure on a current channel, retuning to a pre-agreed channel, and setting a time period to synchronize with the base station on the pre-agreed channel.

30 Claims, 9 Drawing Sheets

PRE-AGREED RADIO LINK FAILURE RECOVERY CHANNEL SEQUENCE

CROSS-REFERENCE TO RELATED APPLICATION

This application claims the benefit under 35 U.S.C. §119 (e) to U.S. Provisional Patent Application No. 61/504,109 entitled "PRE-AGREED RADIO LINK FAILURE RECOVERY CHANNEL SEQUENCE," filed on Jul. 1, 2011, the disclosure of which is expressly incorporated by reference herein in its entirety.

BACKGROUND

1. Field

Aspects of the present disclosure relate generally to wireless communication systems, and more particularly to radio link failure recovery.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In accordance with an aspect of the present disclosure a method of wireless communication, is presented. The method includes transmitting a message to notify a base station of a radio link failure on a current channel. The method also includes retuning to a pre-agreed channel. The method further includes setting a time period to synchronize with the base station on the pre-agreed channel.

According to another aspect, a method of wireless communication in white space is presented. The method includes receiving a radio link failure notification on a current channel from a user equipment (UE). The method further includes retuning to a pre-agreed channel. The method also includes communicating via the pre-agreed channel and setting a time period to synchronize with the UE on the pre-agreed channel.

According to yet another aspect, an apparatus for wireless communications is presented. The apparatus includes a means for transmitting a message to notify a base station of a radio link failure on a current channel. The apparatus further includes a means for retuning to a pre-agreed channel. The apparatus also includes a means for setting a time period to synchronize with the base station on the pre-agreed channel.

According to still yet another aspect, an apparatus for wireless communications is presented. The apparatus includes a means for receiving a radio link failure notification on a current channel from a user equipment (UE). The apparatus further includes a means for retuning to a pre-agreed channel. The apparatus also includes a means for communicating via the pre-agreed channel and a means for setting a time period to synchronize with the UE on the pre-agreed channel.

According to another aspect, a computer program product for wireless communications is presented. The computer program product includes a non-transitory computer-readable medium having program code recorded thereon. The program code includes program code to transmit a message to notify a base station of a radio link failure on a current channel. The program code further includes program code to retune to a pre-agreed channel. The program code also includes program code to set a time period to synchronize with the base station on the pre-agreed channel.

According to yet another aspect, a computer program product for wireless communications is presented. The computer program product includes a non-transitory computer-readable medium having program code recorded thereon. The program code includes program code to receive a radio link failure notification on a current channel from a user equipment (UE). The program code further includes program code to retune to a pre-agreed channel. The program code also includes program code to communicate via the pre-agreed channel and program code to set a time period to synchronize with the UE on the pre-agreed channel.

According to still yet another aspect, an apparatus for wireless communications is presented. The apparatus includes a memory and at least one processor coupled to the memory. The at least one processor is configured to transmit a message to notify a base station of a radio link failure on a current channel. Furthermore, the at least one processor is configured to retune to a pre-agreed channel. Additionally, the at least one processor is configured to set a time period to synchronize with the base station on the pre-agreed channel.

According to another aspect, an apparatus for wireless communications is presented. The apparatus includes a memory and at least one processor coupled to the memory. The at least one processor is configured to receive a radio link failure notification on a current channel from a user equipment (UE). Furthermore, the at least one processor is configured to retune to a pre-agreed channel. Additionally, the at least one processor is configured to communicate via the pre-agreed channel and set a time period to synchronize with the UE on the pre-agreed channel.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
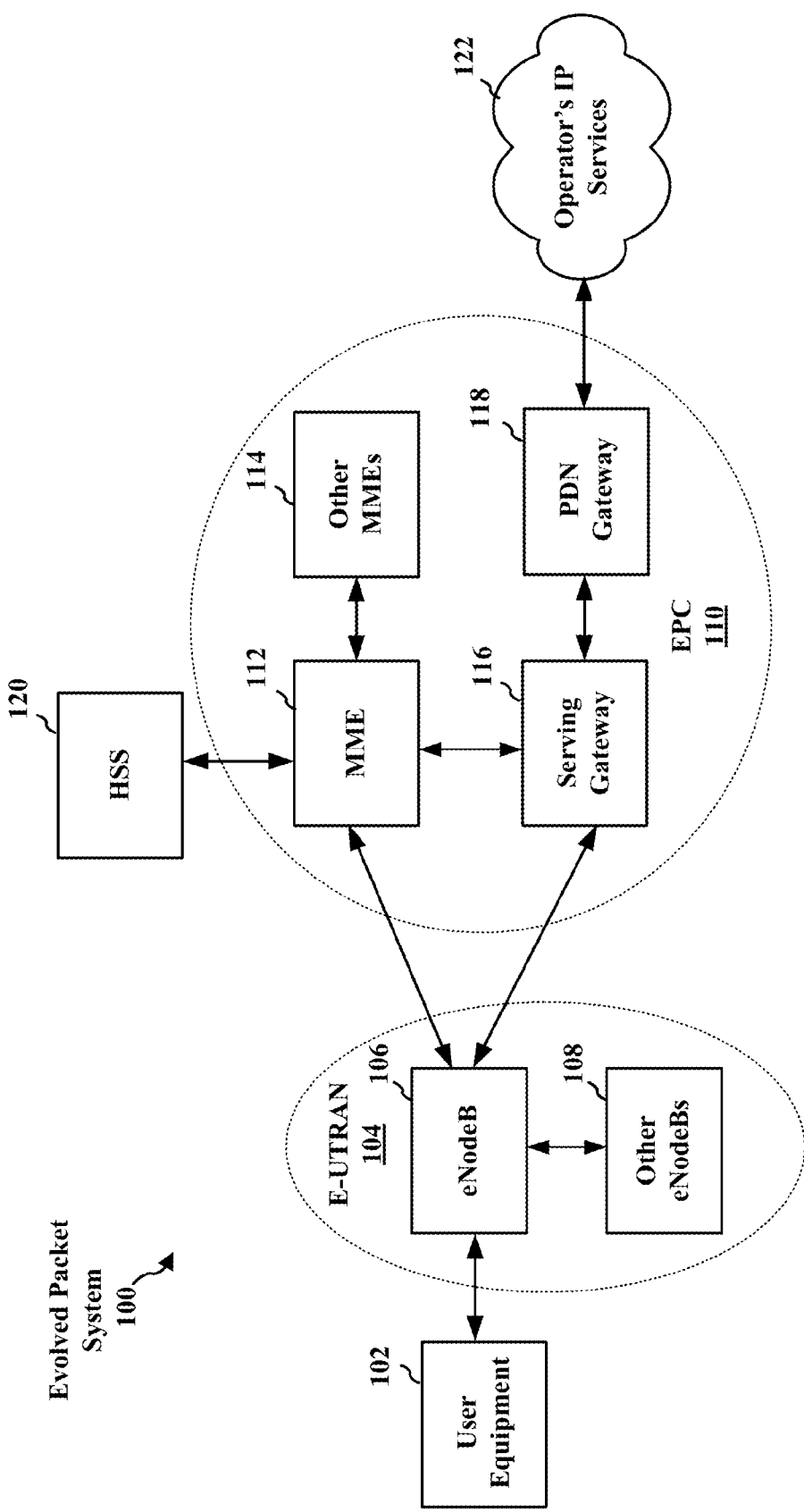
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via an X2 interface (e.g., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
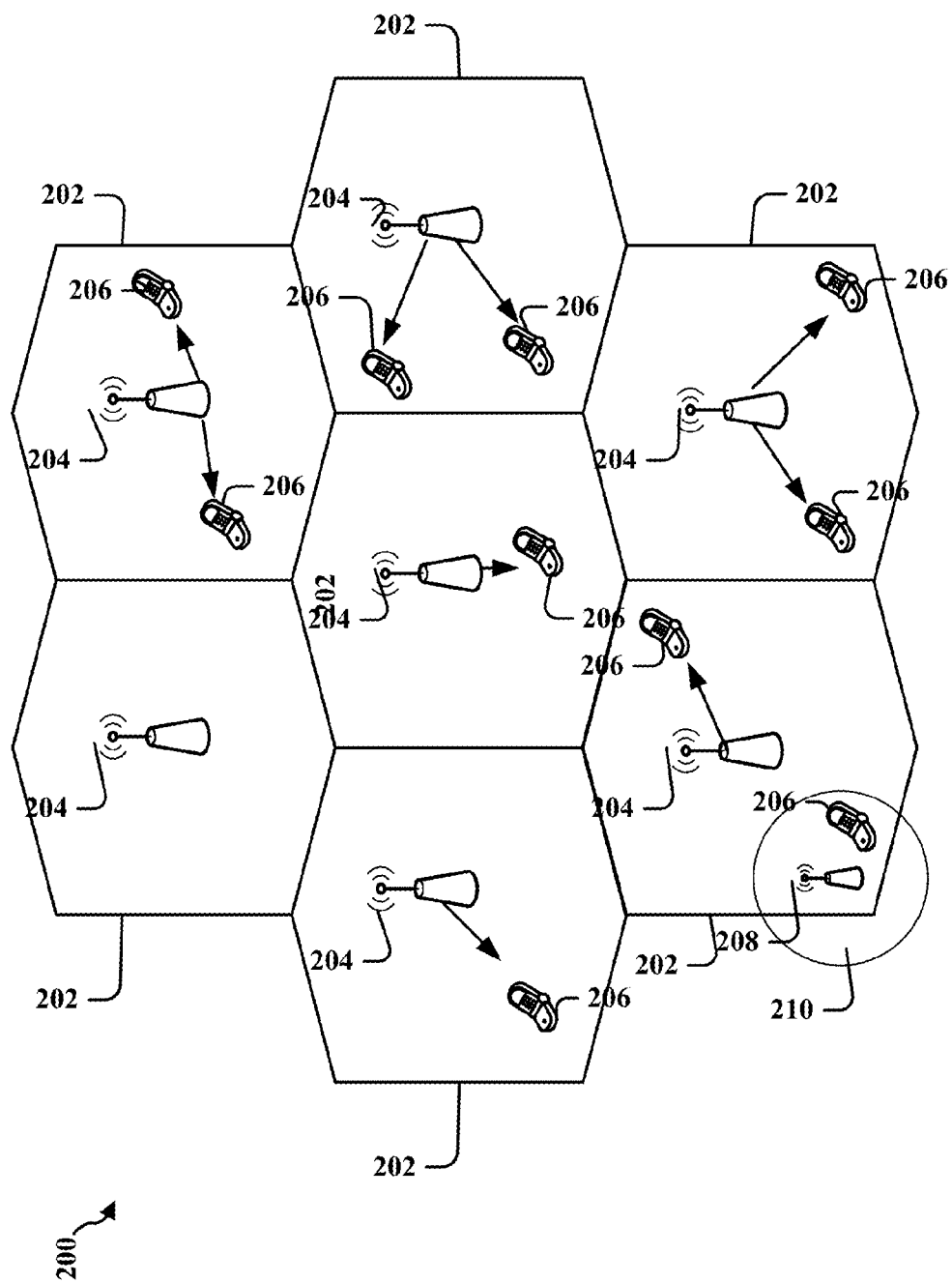
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be referred to as a remote radio head (RRH). The lower power class eNodeB 208 may be a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
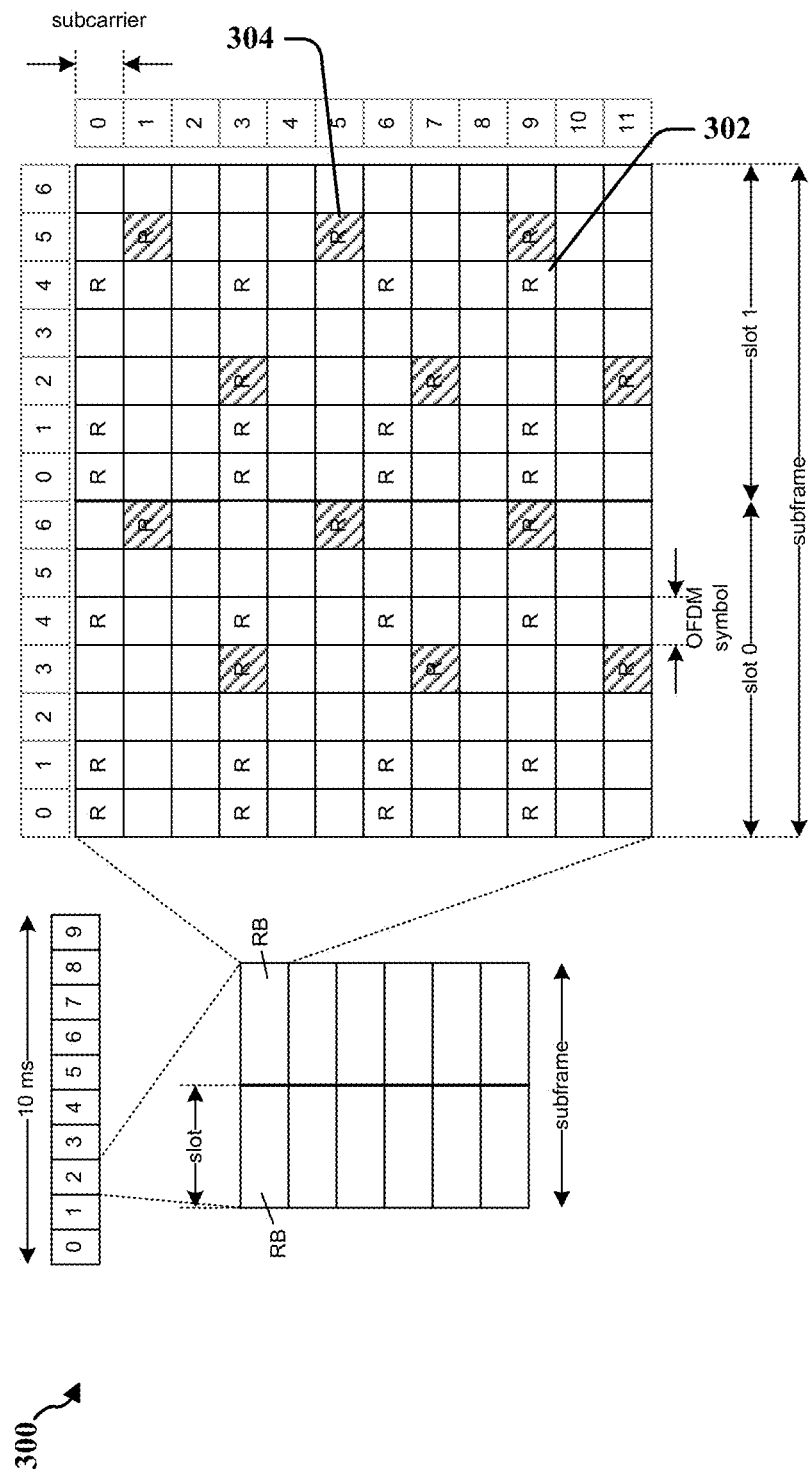
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
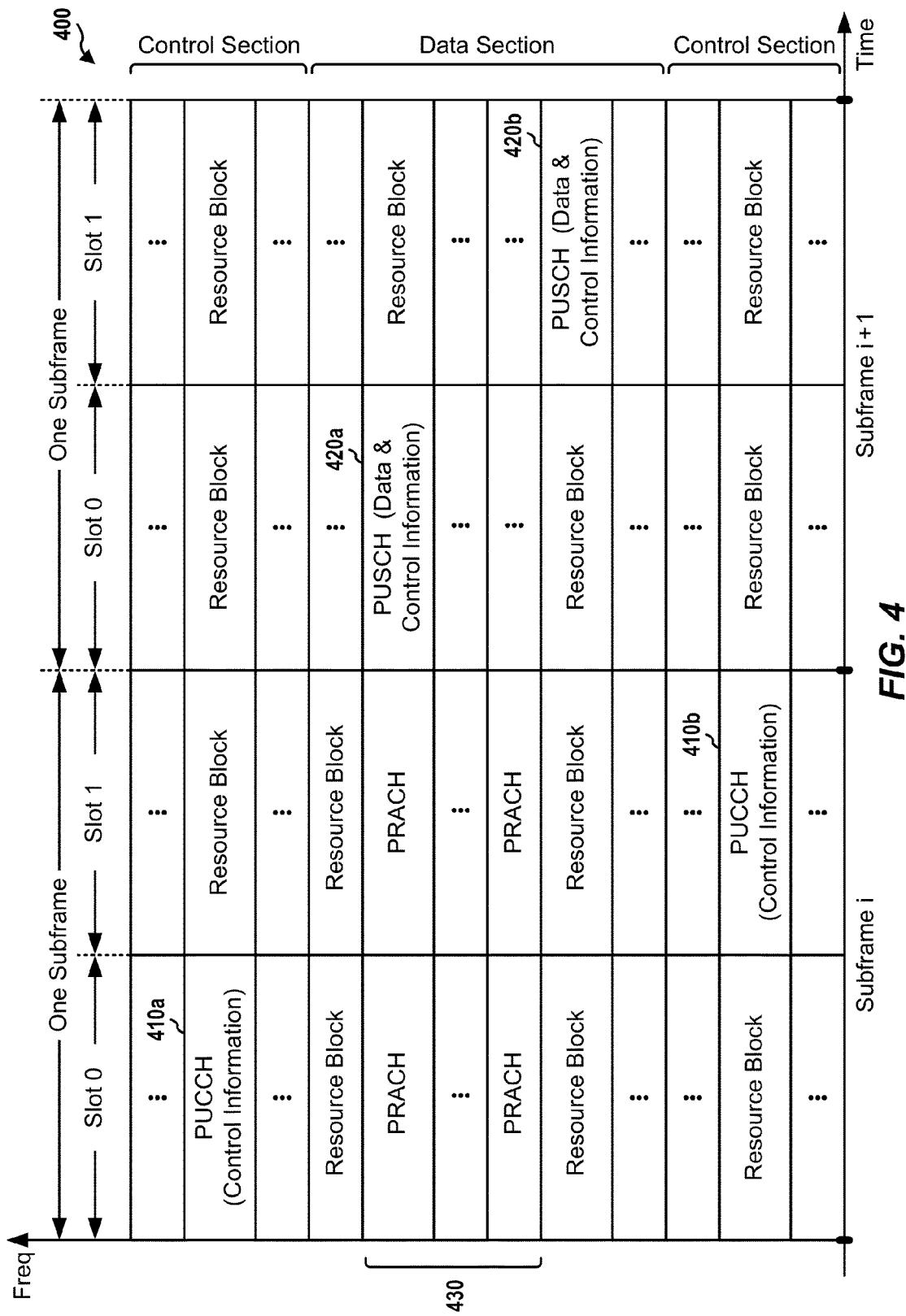
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
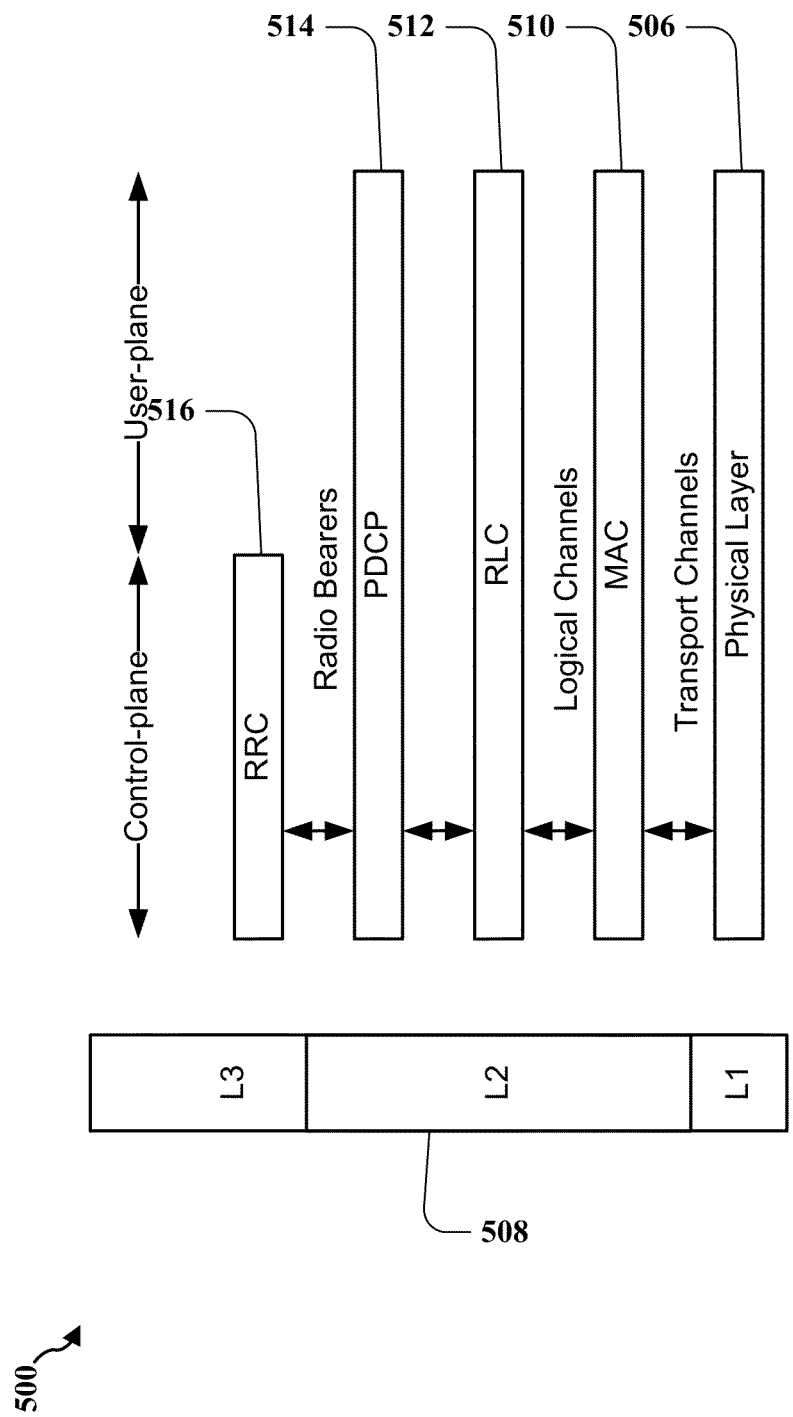
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
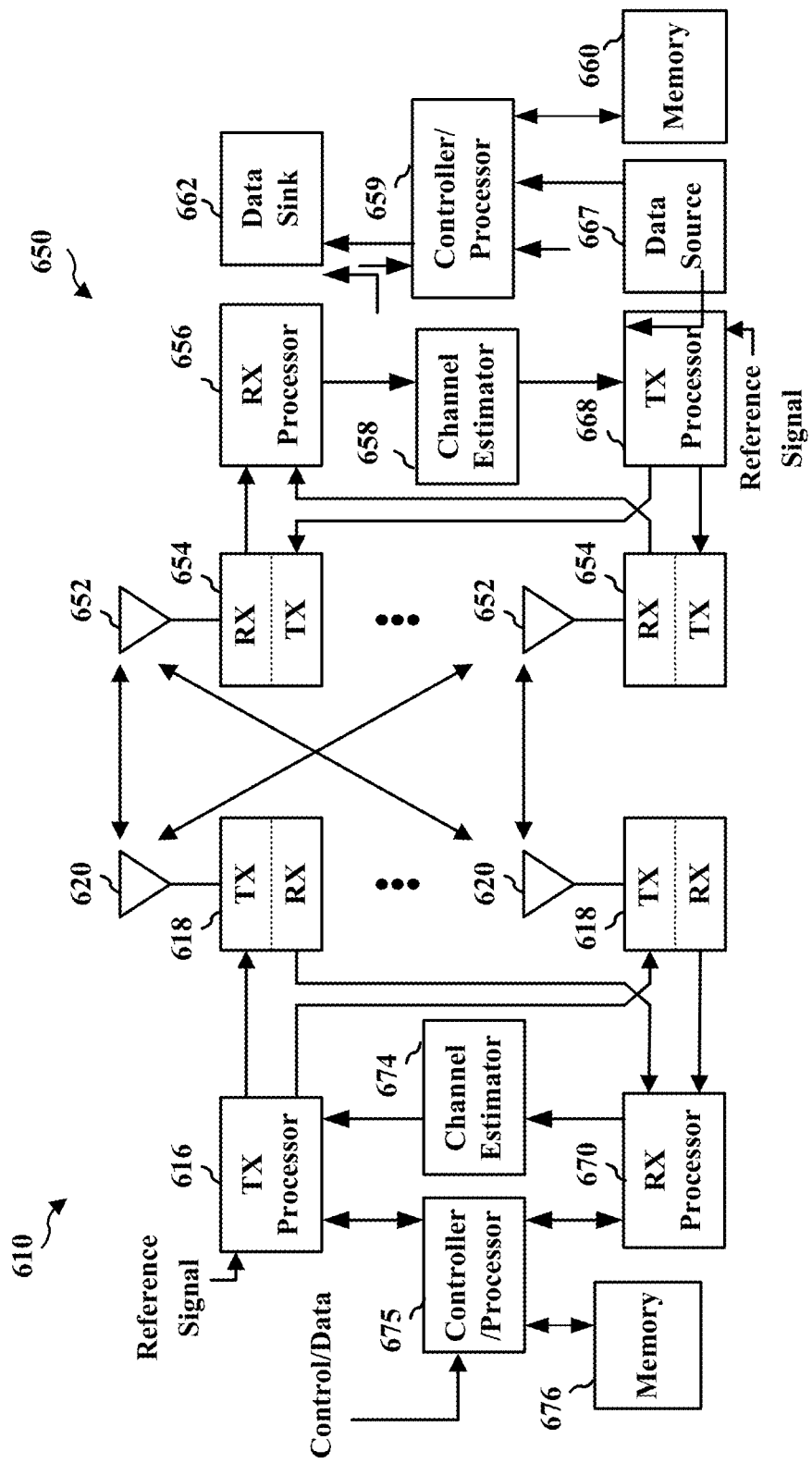
FIG. 6 is a diagram illustrating an example of an evolved Node B and user equipment in an access network.

FIG. 6 is a block diagram of an eNodeB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations In a communication network where the base station-user equipment link is asymmetric, the downlink channel may be in an unreliable frequency spectrum, (e.g., white space), while the uplink channel may be in a reliable frequency spectrum (e.g., in a licensed spectrum), or vice versa. Frequent downlink radio link failures (RLFs) may occur due to interference on the downlink channel while the uplink channel may continue to be reliable. Downlink channels implemented on unlicensed channels (e.g., television (TV) white space, industrial, scientific and medical (ISM) bands, etc.) may encounter interference that causes radio link failures. That is, radio link failures such as physical layer failures, are likely in these frequency spectrums due to interference on the unlicensed channel. The interference may be caused by incumbent users or other secondary users.

Existing radio link failure recovery procedures are slow and degrade a user's experience when radio link failures are frequent. Furthermore, existing radio link failure recovery procedures do not exploit an availability of reliable uplink channels. Therefore, it is desirable to implement a channel switching technique (coordinated with a serving cell) that can seamlessly recover operations between a UE and an eNodeB in the event of a radio link failure.

In the following example, wireless communication between an eNodeB 610 and a UE 650 occurs on a downlink channel in white space and on an uplink channel in a licensed channel. When a downlink radio link failure is detected by the UE 650, a standard procedure, among other operations, may be performed by the UE to recover a channel. The standard procedure may also be referred to as a baseline procedure. The standard procedure may include disabling the uplink transmission, waiting for certain predefined time periods to check for recovery of the failed downlink channel, performing cell selection, performing random access channel procedures (RACH), and performing radio resource control (RRC) connection re-establishment. In one example, a UE 650 switches to a new eNodeB 610 as a result of performing the standard procedure. Additionally, channel reselection on the same eNodeB 610 on a different frequency may be sufficient to mitigate the interference, and therefore, there may not be a need to change the cell when the radio link failure is due to a new jammer on the currently employed channel or frequency. However, it may be desirable to pursue the standard procedure to change cells if the radio link failure persists.

According to one aspect, radio link failure detection may be based on existing criteria such as out-of-sync and in-sync measurements along with corresponding timers and counters when the UE 650 is in communication with the eNodeB 610 and the UE's radio frequency (RF) receiver is tuned on a white space channel. In some aspects, when a radio link failure is detected, rather than following the standard procedure, the UE 650 may notify the eNodeB 610 that a downlink radio link failure has been declared. The UE 650 may then retune its radio frequency (RF) receiver to a pre-agreed channel. The pre-agreed channel refers to a new channel to be used for communication between the eNodeB 610 and the UE 650 that may be pre-agreed between the eNodeB and the UE to facilitate communication during a radio link failure. It is noted that the radio link failure notification sent by the UE cannot be acknowledged by the eNodeB since the downlink is broken.

During the retuning of the UE, or after the UE is retuned to the pre-agreed channel, the UE may start a timer that allows for synchronization of the UE 650 to the eNodeB 610 on the pre-agreed channel. The timer or time period for synchronization may also be started by the eNodeB 610. After retuning, it may be desirable to implement some of the physical (PHY) layer synchronization procedures (e.g., estimation of carrier frequency offset). In some aspects, the UE 650 and the eNodeB 610 are partially synchronized when they are both retuned to the pre-agreed channel. For example, in one scenario, no cell ID is acquired if the cell ID of the eNodeB 610 is either the same after switching channels or different, and the cell ID is known to the UE 650 before switching channels based on signaling from the eNodeB 610. In many cases, unless required for synchronization, the reading of broadcast channels can also be skipped. For example, the new channel may have, or may be assumed to have, the same bandwidth of the original channel, in which case the broadcast channel can be ignored. Similarly, the system information blocks (SIBs)

may have the same content (except for band-related fields, e.g., freqBandIndicator in SIB1), the same number of antennas, etc. Alternatively, while the SIB content may be different, the SIB content may already be known to the UE before changing channels.

According to another aspect, during radio link failure, the UE 650 may also suspend downlink and uplink communication for the duration of the timer mentioned above. In some aspects, the UE 650 may enter a waiting period while grants are pending. For example, a scheduling request (SR) may be sent on PUCCH and the UE 650 may enter a waiting period to wait for an uplink grant from the eNodeB 610. While in the waiting period, the UE 650 may not enter a discontinues reception (DRX) mode. Still, the UE 650 may perform a channel switching procedure and discontinues reception while in the waiting period. In another example, an uplink grant for a pending HARQ retransmission can occur. When the timer expires, the UE 650 may enter an active mode and may monitor for a PDCCH on the new channel. After at least M (where M is a design parameter) subframes of PDCCHs have been decoded, the UE 650 can return to normal operations.

In some aspects, when the eNodeB 610 successfully receives a radio link failure notification from the UE 650, the eNodeB 610 may follow a sequence including retuning one of its available radio frequency (RF) transmitters to the destination channel (pre-agreed with the UE 650) and starting a timer. When the RF transmitter is ready to transmit on the new channel, standard LTE downlink synchronization and control channels may be transmitted (e.g., primary synchronization signal (PSS)/secondary synchronization signal (SSS)/physical broadcast channel (PBCH)/cell-specific reference signal (CRS)/system information blocks(SIBs)).

In some aspects, all other communications between the UE 650 and the eNodeB 610 are suspended while the timer is active. For example, pending PDCCH grants and commands may be postponed when the timer is active. Furthermore, pending PDCCH grants and commands for the UE are transmitted on the new channel when the timer expires. The channel quality of the new channel may be different from the previous channel. Accordingly, the eNodeB 610 may request the UE 650 to send an aperiodic channel quality index (CQI) report via a suitable physical downlink control channel (PDCCH) downlink control information (DCI) grant.

For a successful radio link failure recovery, both the eNodeB 610 and the UE 650 retune to the same channel. In some aspects, the eNodeB 610 and the UE 650 may retune to a licensed channel when a radio link failure is declared by a UE 650 tuned on a white space channel. Additionally, in another aspect, the eNodeB 610 and the associated UEs 650 may maintain a UE-specific sorted list of backup channels. The backup channels may be pre-agreed channels. The list may be generated and exchanged between the eNodeBs 610 and the UEs 650 in manners understood by those skilled in the art. In some aspects, when a radio link failure is detected, the first channel in the list is initially selected, and selection of the channels from the lists may be sequential if the initially selected channel fails.

The licensed channel(s) may have different bandwidths (BWs) with respect to unlicensed channels. For example, white space unlicensed channels may operate on a 5 MHz bandwidth due to TV band fragmentation, while licensed channels may use larger and/or smaller bandwidth. When different bandwidths exist between the previous unlicensed channel and the new licensed channel, for example, retuning may be insufficient to mitigate a radio link failure. In this case, when the timer expires, the UE 650 reads a physical broadcast channel (PBCH) to learn the bandwidth of the new channel and thereby increases the latency of the recovery process, due to the periodicity (e.g., 40 ms) of the PBCH.

In order to accommodate bandwidth differences, the timer at the UE side may be set to a smaller value than the timer at the eNodeB 610 side. The timer may be adjusted in order to provide enough time to the UE 650 for acquisition. In some aspects, the retuning of the UE 650 and the eNodeBs 610 may be based on a pre-negotiated bandwidth. Recovery on a channel with the pre-negotiated bandwidth may reduce or eliminate some of the latency of the channel recovery process.

In some aspects, the newly selected channel may also suffer from a radio link failure. For example, an interferer may have recently occupied the selected channel, and the UE 650 and the eNodeB 610 may not have updated the backup list of channels. In another example, the radio link failure may be due to bad geometry. Specifically, in this example, the UE 650 may be leaving a coverage area of the cell and no handover has been signaled by the eNodeB 610. Therefore, the radio link failure may persist regardless of the selected channel. The following solutions may address a persistent radio link failure issue.

In one aspect, when the timer expires at the UE side, the UE 650 may begin measuring PDCCH decoding quality on the new channel if the new channel is on licensed spectrum. Furthermore, the baseline procedure described above can be followed if the radio link failure is declared by the UE 650 when tuned on the licensed channel.

In another aspect, when the timer expires at the UE side, the UE 650 may begin measuring PDCCH decoding quality on the new channel if the new channel is on an unlicensed spectrum. Furthermore, the second channel in the list of backup channels may be selected, and the recovery procedure described above is repeated if a radio link failure is declared on the unlicensed spectrum. The recovery procedure may be repeated up to the minimum of (P, L) times, where P is a design parameter and L is a length of the backup channel list. After min(P, L) attempts, the baseline or standard procedure described above may be followed if the radio link failure is declared again.

When a radio link failure occurs, in order to increase a time of the channel recovery procedure, a handshake can occur. An exemplary handshake includes the eNodeB 610 transmitting information in a first subframe after the timer expires. The information should evoke a response from the UE 650. In one configuration, the information is at least one PDCCH downlink control information (DCI) message scrambled with a cell radio network temporary identifier (C-RNTI) of the UE 650. For example, the message may include an asynchronous channel quality index (CQI) request. This handshake between the UE 650 and the eNodeB 610 may alternatively be in the form of acknowledgement (ACK)/negative acknowledgement (NACK) sequence.

As discussed above, while the uplink channel stays reliable when the downlink channel suffers from the radio link failure, the UE 650 notifies the eNodeB 610 of the radio link failure. Various options may be available to the UE 650 for notifying the eNodeB 610 of the radio link failure. Currently, a scheduling request is periodically signaled by the UE 650 (in PUCCH, if PUSCH is not transmitted). In order to facilitate the notification, a special scheduling request value (e.g., equal to −1) may be defined. When a radio link failure is detected, the UE 650 may send this special scheduling request value in a first scheduling request reporting occasion.

In some aspects, notifying the eNodeB 610 may include a special random access channel (RACH) procedure. The special RACH procedure may be initiated by the UE 650 when a radio link failure is declared. The special RACH procedure may include special physical random access channel (PRACH) sequences having different roots or different orthogonal shifts, distinct subframes (PRACH occasions) and/or distinct frequencies. When the eNodeB 610 detects a special PRACH sequence, the eNodeB 610 recognizes that the sending UE 650 is declaring a radio link failure. Therefore, the eNodeB 610 should be able to figure out which UE 650 sent the sequence. The eNodeB 610 can determine the sending UE 650 by recognizing a unique combination of sequences and resources assigned to each UE 650, or alternatively, the UE 650 can incorporate its identity in subsequent messages.

In some aspects, the UE 650 may notify the eNodeB 610 of a radio link failure with a keep-alive message, which the UEs may be requested to periodically send in an uplink channel (e.g., with cognitive UEs). In some aspects, a suitable semi-persistent scheduling (SPS) grant may be devoted to this purpose. The SPS grant should have low periodicity (to allow quick notification) but few allocated resource blocks (RBs) to reduce overhead.

The radio link failure notification may not be received by the eNodeB 610 or may be erroneously received by the eNodeB 610. The failed notice may occur because the uplink channel becomes unreliable, for example, or because the notification is not detected correctly by the eNodeB 610. In case the radio link failure notice fails, the UE 650 would retune and the eNodeB 610 would not retune.

If the new channel was unlicensed, the UE 650 may issue a second radio link failure notification (assuming no common reference signal (CRS) is transmitted by the eNodeB 610 on the destination channel). Thus, the eNodeB 610 might receive the second notice and act accordingly to recover the channel.

If the destination channel was licensed (assuming the eNodeB 610 transmits CRS and control channels), the UE 650 may not issue a radio link failure, but the UE 650 would not receive the hand shake on the new channel in the first subframe after the timer expires. If no suitable handshake message is received after some number of subframes after the timer expires, according to one aspect of the present disclosure, the UE declares a legacy radio link failure and follows the baseline procedure described above.

Figure 7:
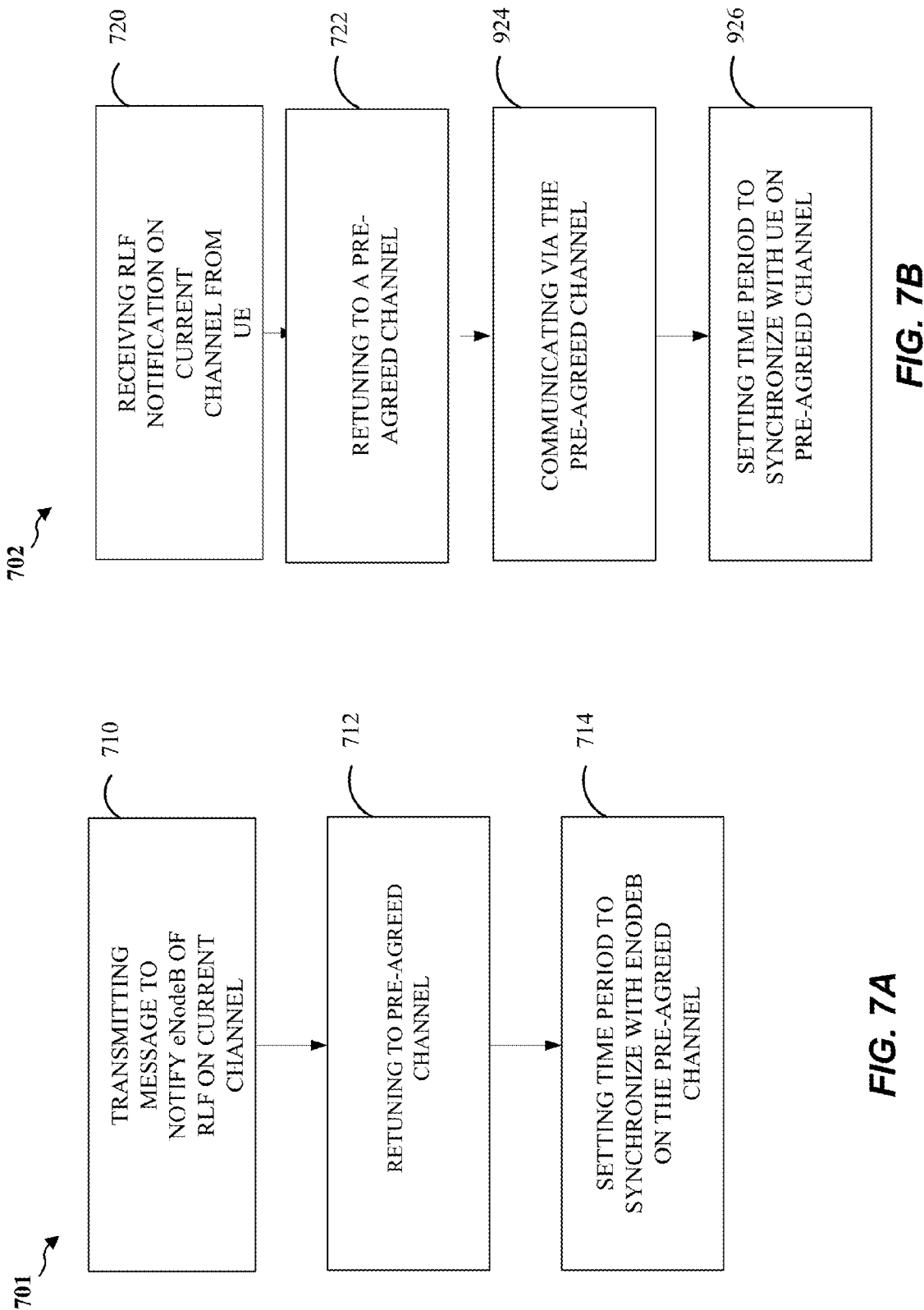
FIG. 7A is a block diagram illustrating a method for radio link failure recovery according to aspects of the present disclosure.
FIG. 7B is a block diagram illustrating a method for radio link failure recovery according to other aspects of the present disclosure.

FIGS. 7A-7B illustrate methods for wireless communication 701. 702. The method 701 illustrated in FIG. 7A may be implemented in the UE 650 of FIG. 6. As illustrated in FIG. 7A, the UE may transmit a message to notify an eNodeB of a radio link failure on a current channel, as shown in block 710. The UE may then retune to a pre-agreed channel, as shown in block 712. Furthermore, the UE may set a time period to synchronize with the eNodeB on the pre-agreed channel, as shown in block 714.

In one configuration, the UE 650 is configured for wireless communication including means for transmitting a message to notify an eNodeB of a radio link failure on a current channel. In one aspect, the receiving means may be the controller processor 659, memory 660, TX Processor 668, and antenna 652 configured to perform the functions recited by the transmitting means. The UE 650 is also configured to include a means for retuning to a pre-agreed channel. In one aspect, the retuning means may be the controller processor 659, memory 660, TX Processor 668, and antenna 652 configured to perform the functions recited by the retuning means. The eNodeB 610 is also configured to include a means for setting a time period to synchronize with the eNodeB on the pre-agreed channel. In one aspect, the setting means may be the controller processor 659, memory 660, TX Processor 668, and antenna 652 configured to perform the functions recited by the setting means. In another aspect, the aforementioned means may be any module or any apparatus configured to perform the functions recited by the aforementioned means.

The method 702 illustrated in FIG. 7B may be implemented in the eNodeB 610 of FIG. 6. As illustrated in FIG. 7B, an eNodeB may receive a RLF notification on a current channel from a remote UE, as shown in block 720. The eNodeB may retune to a pre-agreed channel, as shown in block 722. Furthermore, the eNodeB may communicate via the pre-agreed channel, as shown in block 724. Additionally, as shown in block 726, the eNodeB may set a time period to synchronize with the UE on the pre-agreed channel.

In one configuration, the eNodeB 610 is configured for wireless communication including means for receiving a radio link failure notification on a current channel from a user equipment (UE), means for retuning to a pre-agreed channel, means for communicating via the pre-agreed channel, and means for setting a time period to synchronize with the UE on the pre-agreed channel. In one aspect, the aforementioned means may be the controller processor 675, memory 676, receive processor 670, and antenna 620 configured to perform the functions recited by the cited means.

Figure 8:
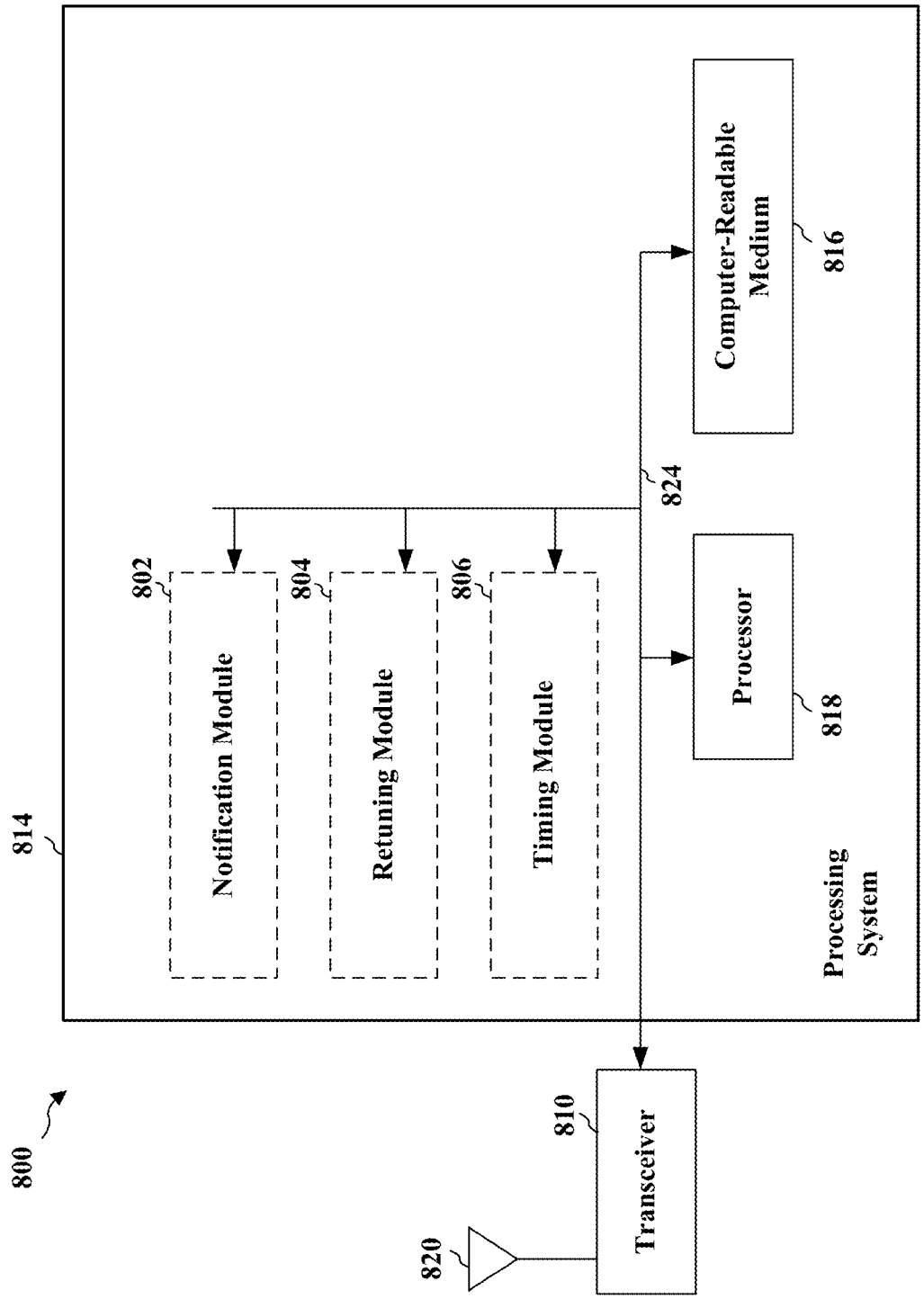
FIGS. 8-9 are block diagrams illustrating different modules/means/components in an exemplary apparatus according to aspects of the present disclosure.

FIG. 8 is a diagram illustrating an example of a hardware implementation for an apparatus 800 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 818 the modules 802-806, and the computer-readable medium 816. The bus 824 may also link various other circuits such as timing sources, peripherals, voltage regulators, and power management circuits, which are well known in the art, and therefore, will not be described any further.

The processing system 814 is coupled to a transceiver 810. The transceiver 810 is coupled to one or more antennas 820. The transceiver 810 enables communicating with various other apparatus over a transmission medium. The processor 818 is responsible for general processing, including the execution of software stored on the computer-readable medium 816. The software, when executed by the processor 818, causes the processing system 814 to perform the various functions described for any particular apparatus. The computer-readable medium 816 may also be used for storing data that is manipulated by the processor 818 when executing software.

The processing system 814 includes a notification module 802, a retuning module 804 and a timing module 806. The notification module 802 can transmit a message to notify an eNodeB of a radio link failure on a current channel. The retuning module 804 can retune to a pre-agreed channel. Furthermore, the timing module 806 can set a time period to synchronize with the eNodeB on the pre-agreed channel. The modules may be software modules running in the processor 818, resident/stored in the computer readable medium 816, one or more hardware modules coupled to the processor 818, or some combination thereof. The processing system 814 may be a component of the UE 650 and may include the memory 660, the transmit processor 668, the receive processor 656, the modulators/demodulators 654, the antenna 652, and/or the controller/processor 659.

Figure 9:
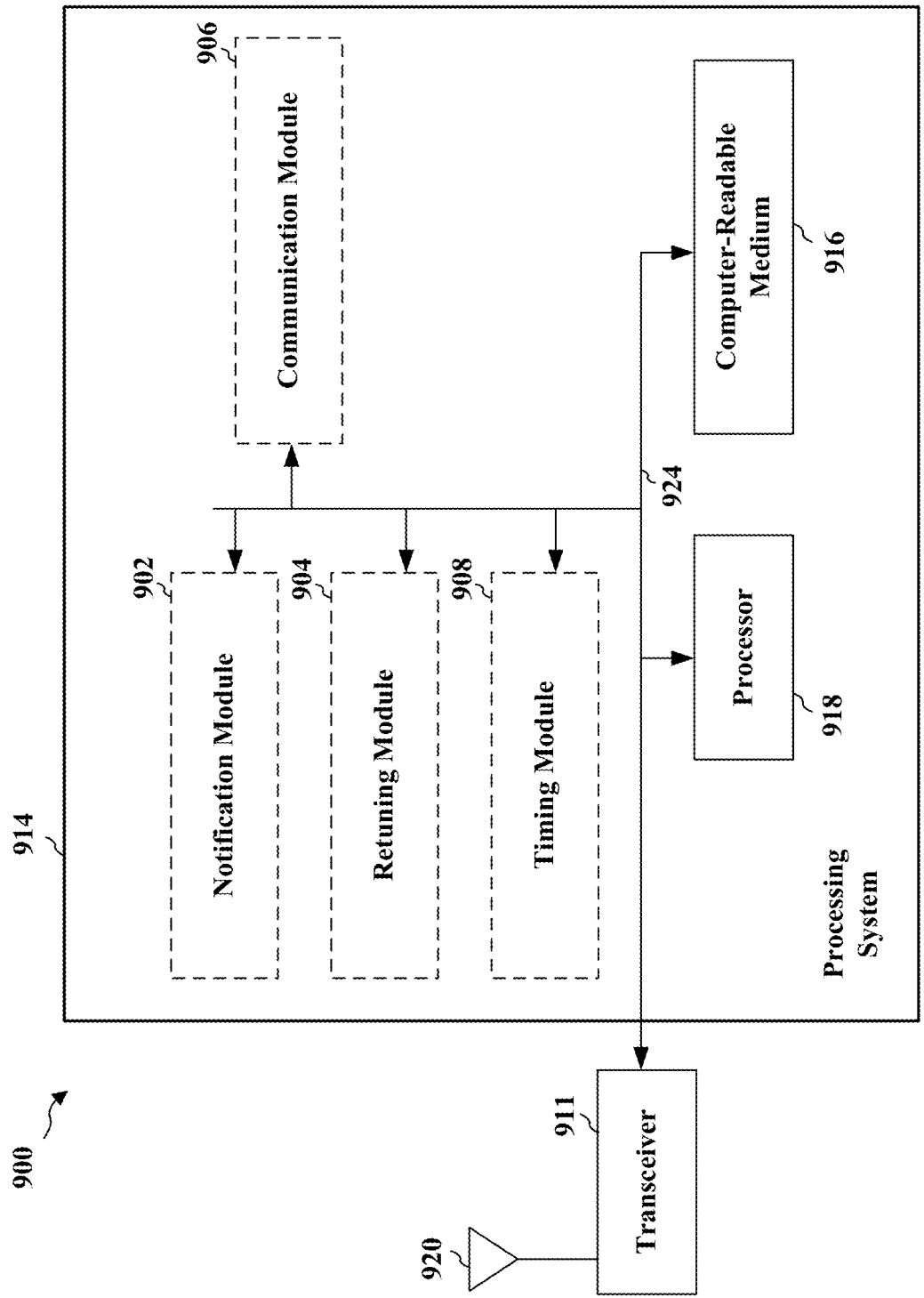

FIG. 9 is a diagram illustrating an example of a hardware implementation for an apparatus 900 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 918 the modules 902-908, and the computer-readable medium 916. The bus 924 may also link various other circuits such as timing sources, peripherals, voltage regulators, and power management circuits, which are well known in the art, and therefore, will not be described any further.

The processing system 914 is coupled to a transceiver 911. The transceiver 911 is coupled to one or more antennas 920. The transceiver 911 enables communicating with various other apparatus over a transmission medium. The processor 918 is responsible for general processing, including the execution of software stored on the computer-readable medium 916. The software, when executed by the processor 918, causes the processing system 914 to perform the various functions described for any particular apparatus. The computer-readable medium 916 may also be used for storing data that is manipulated by the processor 918 when executing software.

The processing system 914 includes a notification module 902, a retuning module 904, a communication module 906, and a timing module 908. The notification module 902 can receive a radio link failure notification on a current channel from a UE. The retuning module 904 can retune to a pre-agreed channel. Furthermore, the communication module 906 can communication via the pre-agreed channel. Moreover, the timing module 908 can set a time period to synchronize with the UE on the pre-agreed channel. The modules may be software modules running in the processor 918, resident/stored in the computer readable medium 916, one or more hardware modules coupled to the processor 918, or some combination thereof. The processing system 914 may be a component of the eNodeB 610 and may include the memory 676, the transmit processor 616, the receive processor 670, the modulators/demodulators 618, the antenna 620, and/or the controller/processor 675.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method of wireless communication, comprising:
transmitting a message, from a user equipment (UE), to notify a base station of a radio link failure on a current channel;

tuning from the current channel to a first pre-agreed channel, the first pre-agreed channel being different from the current channel and being used for communication between the base station and the UE during the radio link failure, and the message being unacknowledged by the base station due to the radio link failure; and setting a time period, for the UE, to synchronize with the base station on the first pre-agreed channel.

2. The method of claim 1, in which the tuning is performed on a pre-negotiated bandwidth.

3. The method of claim 1, further comprising:
maintaining a sorted list of pre-agreed channels comprising at least the first pre-agreed channel and a second pre-agreed channel; and
tuning to the second pre-agreed channel when the time period expires without synchronization of the UE and the base station.

4. The method of claim 1, in which the notifying comprises transmitting at least a special scheduling request, a periodic keep alive message, special physical random access channel (PRACH) sequences, or a combination thereof.

5. The method of claim 1, further comprising suspending downlink and uplink communications during the time period.

6. The method of claim 1, in which the tuning further comprises tuning to a licensed channel when the radio link failure is declared for a white space channel.

7. The method of claim 1, further comprising receiving a physical data control channel (PDCCH) grant on the first pre-agreed channel when the time period expires.

8. The method of claim 1, further comprising initiating a new radio link failure procedure when a physical data control channel (PDCCH) grant on the first pre-agreed channel is not received by the UE within a specific time period after the time period expires.

9. A method of wireless communication, comprising:
receiving, from a user equipment (UE) at a base station, a radio link failure notification on a current channel;
tuning from the current channel to a first pre-agreed channel, the first pre-agreed channel being different from the current channel and being used for communication between the base station and the UE during a radio link failure, and the radio link failure notification being unacknowledged by the base station due to the radio link failure;
communicating via the first pre-agreed channel; and
setting a time period, for the base station, to synchronize with the UE on the first pre-agreed channel.

10. The method of claim 9, further comprising transmitting a physical data control channel (PDCCH) grant on the first pre-agreed channel when the time period expires.

11. The method of claim 9, further comprising requesting a channel quality indication report on the first pre-agreed channel.

12. The method of claim 9, further comprising suspending downlink and uplink communication during the time period.

13. The method of claim 12, further comprising restoring suspended communications in response to receiving a handshake message from the UE.

14. An apparatus for wireless communications, comprising:
means for transmitting, from a user equipment (UE), a message to notify a base station of a radio link failure on a current channel;
means for tuning from the current channel to a first pre-agreed channel, the first pre-agreed channel being different from the current channel and being used for communication between the base station and the UE during the radio link failure, and the message being unacknowledged by the base station due to the radio link failure; and
means for setting a time period, for the UE, to synchronize with the base station on the first pre-agreed channel.

15. An apparatus for wireless communications, comprising:
means for receiving, from a user equipment (UE) at a base station, a radio link failure notification on a current channel;
means for tuning from the current channel to a first pre-agreed channel;
means for communicating via the first pre-agreed channel, the first pre-agreed channel being different from the current channel and being used for communication between the base station and the UE during a radio link failure, and the radio link failure notification being unacknowledged by the base station due to the radio link failure; and
means for setting a time period, for the base station, to synchronize with the UE on the first pre-agreed channel.

16. A computer program product for wireless communications, the computer program product comprising:
a non-transitory computer-readable medium having program code recorded thereon, the program code including:
program code to transmit, from a user equipment (UE), a message to notify a base station of a radio link failure on a current channel;
program code to tune from the current channel to a first pre-agreed channel, the first pre-agreed channel being different from the current channel and being used for communication between the base station and the UE during the radio link failure, and the message being unacknowledged by the base station due to the radio link failure; and
program code to set a time period, for the UE, to synchronize with the base station on the first pre-agreed channel.

17. A computer program product for wireless communications, the computer program product comprising:
a non-transitory computer-readable medium having program code recorded thereon, the program code including:
program code to receive, from a user equipment (UE) at a base station, a radio link failure notification on a current channel;
program code to tune from the current channel to a first pre-agreed channel, the first pre-agreed channel being different from the current channel and being used for communication between the base station and the UE during a radio link failure, and the radio link failure notification being unacknowledged by the base station due to the radio link failure;
program code to communicate via the first pre-agreed channel; and
program code to set a time period, for the base station, to synchronize with the UE on the first pre-agreed channel.

18. A user equipment (UE) for wireless communications, comprising:
a memory; and
at least one processor coupled to the memory, the at least one processor being configured:
to transmit a message to notify a base station of a radio link failure on a current channel;

to tune from the current channel to a first pre-agreed channel, the first pre-agreed channel being different from the current channel and being used for communication between the base station and the UE during the radio link failure, and the message being unacknowledged by the base station due to the radio link failure; and to set a time period to synchronize with the base station on the first pre-agreed channel.

19. The UE of claim 18, in which the tuning is performed on a pre-negotiated bandwidth.

20. The UE of claim 18, in which the at least one processor is further configured:
to maintain a sorted list of pre-agreed channels comprising at least the first pre-agreed channel and a second pre-agreed channel; and
to tune to the second pre-agreed channel when the time period expires without synchronization with the base station.

21. The UE of claim 18, in which the at least one processor is configured to notify by transmitting at least a special scheduling request, a periodic keep alive message, special physical random access channel (PRACH) sequences, or a combination thereof.

22. The UE of claim 18, in which the at least one processor is further configured to suspend downlink and uplink communications during the time period.

23. The UE of claim 18, in which the at least one processor is configured to tune to a licensed channel when the radio link failure is declared for a white space channel.

24. The UE of claim 18, in which the at least one processor is further configured to receive a physical data control channel (PDCCH) grant on the first pre-agreed channel when the time period expires.

25. The UE of claim 18, in which the at least one processor is further configured to initiate a new radio link failure procedure when a physical data control channel (PDCCH) grant on the a second pre-agreed channel is not received within a specific time period after the time period expires.

26. A base station for wireless communications, comprising:
a memory; and
at least one processor coupled to the memory, the at least one processor being configured:
to receive a radio link failure notification on a current channel from a user equipment (UE);
to tune from the current channel to a first pre-agreed channel, the first pre-agreed channel being different from the current channel and being used for communication between the base station and the UE during a radio link failure, and the radio link failure notification being unacknowledged by the base station due to the radio link failure;
to communicate via the first pre-agreed channel; and
to set a time period to synchronize with the UE on the first pre-agreed channel.

27. The base station of claim 26, in which the at least one processor is further configured to transmit a physical data control channel (PDCCH) grant on the first pre-agreed channel when the time period expires.

28. The base station of claim 26, in which the at least one processor is further configured to request a channel quality indication report on the first pre-agreed channel.

29. The base station of claim 26, in which the at least one processor is further configured to suspend downlink and uplink communication during the time period.

30. The base station of claim 29, in which the at least one processor is further configured to restore suspended communications in response to receiving a handshake message from the UE.

* * * * *